O. A. Dodge,
Boiler-Furnace Draft-Regulator.
Nº 52,695.   Patented Feb. 20, 1866.
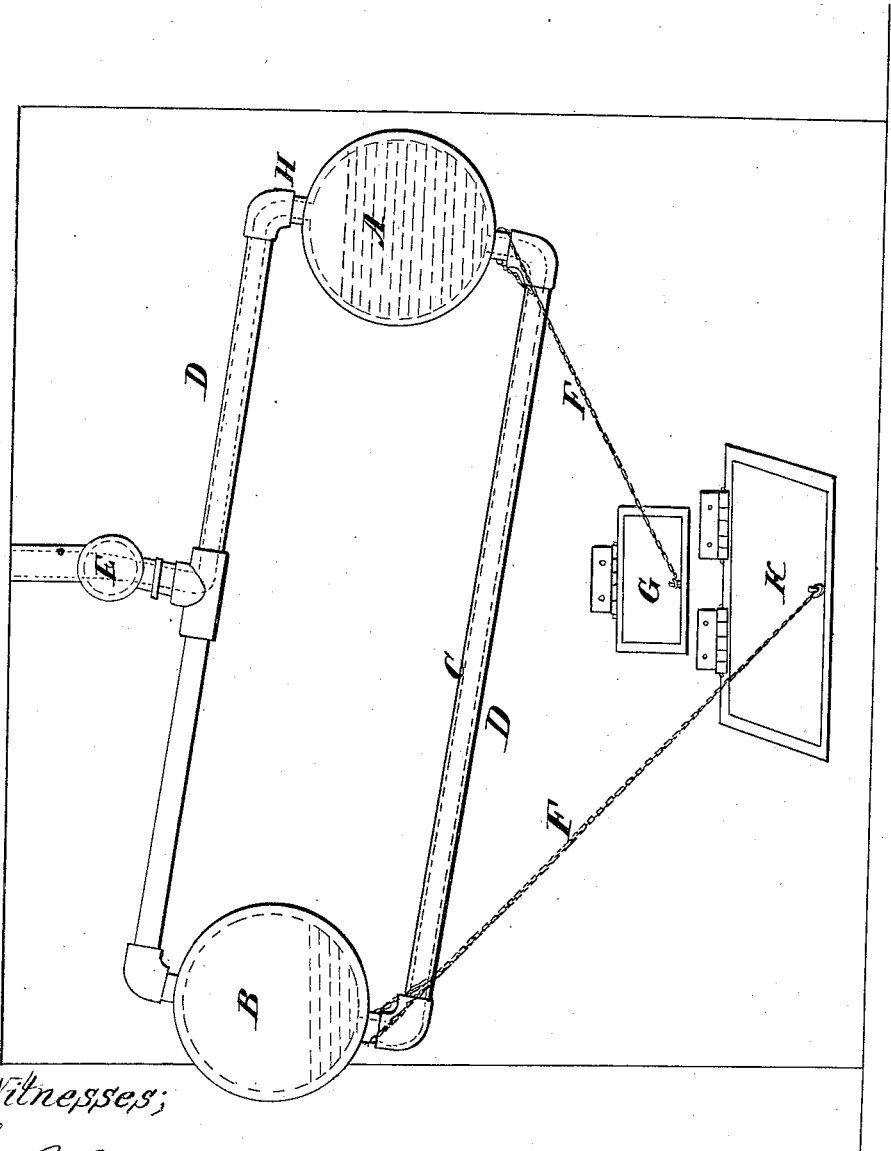
Witnesses;
Inventor,
O. A. Dodge

UNITED STATES PATENT OFFICE.

OMRI A. DODGE, OF BURLINGTON, VERMONT.

IMPROVEMENT IN FURNACE-DOOR REGULATORS.

Specification forming part of Letters Patent No. 52,695, dated February 20, 1866.

*To all whom it may concern:*

Be it known that I, OMRI A. DODGE, of Burlington, in the county of Chittenden and State of Vermont, have invented a new and Improved Mode of Regulating the Draft to the Furnaces of Steam-Boilers by the Pressure of the Steam or Water in the Boiler; and I do hereby declare that the following is a full and exact description thereof, reference being had to the accompanying drawings, and to the letters of reference marked thereon.

The nature of my invention consists in supporting on a pivot attached to the boiler two hollow balls or cylinders connected by a pipe attached to the bottom of each, one of the balls to be provided with an opening on the top, into which is poured quicksilver or other heavy liquid in sufficient quantity to fill that ball and the connecting-pipe, the confined air preventing the fluid from rising as high in the second ball as the first. The opening in the top of the first ball is connected by means of a flexible tube or otherwise with the boiler below the water-line. The balls, or framework which supports them, are connected, by means of chains or otherwise, with the draft of the furnace. The pressure of the water or steam upon the mercury forces it (the mercury) into the second ball, causing the framework to which the balls are attached to turn upon its bearings, thus opening or shutting the dampers to the furnace according as the adjustment is made, the confined air in the second ball pressing the mercury back, when the pressure of the water or steam is removed.

To enable others skilled in the art to make and use my invention, I will proceed to describe its construction and operation.

In diagram I, A and B represent two hollow balls or cylinders, connected by a pipe, C, attached to the bottom of each, the whole being attached to or supported by a frame, which is hung upon a peg or pivot, E.

Chains F F connect the frame-work or balls A and B, respectively, with the dampers to the furnace-doors G and K.

The ball A is provided with an opening, H, in the top, into which is poured quicksilver or other heavy liquid in sufficient quantity to fill the ball A and the connecting-pipe C. In the process of filling, the pipe C fills first, then the balls A and B, A becoming full first, the air compressed in the ball B preventing the fluid from rising as high in that ball as in A.

The opening H in the top of ball A is connected, by means of a passage through the hollow joint or pivot E, or otherwise, with the boiler below the water-line. The pressure of the water upon the surface of the mercury in the ball A forces it through the pipe C into the ball B, when the center of gravity, having been changed, the frame D D turns upon the bearing or pivot E, the ball B falling and the ball A rising. The damper G is opened and the damper K closed according as the adjustment is made by means of the chains F F. The damper being closed the fire is checked, and the pressure of steam or water being thus proportionately diminished, the pressure of the compressed air in the ball B, acting upon the mercury in the ball B, forces it, or rather a sufficient portion of it, back into the ball A to allow the apparatus to resume its original position.

What I claim as my invention, and desire to secure by Letters Patent, is—

The arrangement of the pivot E, opening H, balls A and B, pipe C, with the chains F F, and furnace-doors G K, whereby to automatically regulate the quantity of air admitted to the furnace of steam-generators, substantially in the manner and for the purpose as herein set forth.

O. A. DODGE.

Witnesses:
GEORGE A. NOLEN,
HENRY T. MUNSON.